US011199639B2

(12) United States Patent
Morrish et al.

(10) Patent No.: US 11,199,639 B2
(45) Date of Patent: Dec. 14, 2021

(54) BOREHOLE SEISMIC SENSOR ARRAY AND ASSOCIATED METHODS

(71) Applicant: High-Definition Seismic Corporation, Cochrane (CA)

(72) Inventors: Mark Hugh Leslie Morrish, Cochrane (CA); Michael Paul Davison, Calgary (CA)

(73) Assignee: High-Definition Seismic Corporation, Cochrane (CA)

( * ) Notice: Subject to any disclaimer, the term of this patent is extended or adjusted under 35 U.S.C. 154(b) by 0 days.

(21) Appl. No.: 16/560,128

(22) Filed: Sep. 4, 2019

(65) Prior Publication Data

US 2020/0072994 A1 Mar. 5, 2020

Related U.S. Application Data

(60) Provisional application No. 62/726,819, filed on Sep. 4, 2018.

(51) Int. Cl.
*G01V 1/16* (2006.01)
*G01V 1/20* (2006.01)
*G01V 1/52* (2006.01)

(52) U.S. Cl.
CPC ............. *G01V 1/166* (2013.01); *G01V 1/16* (2013.01); *G01V 1/201* (2013.01); *G01V 1/202* (2013.01); *G01V 1/52* (2013.01); *G01V 2001/205* (2013.01)

(58) Field of Classification Search
CPC ........ G01V 1/166; G01V 1/168; G01V 1/201; G01V 2001/205; G01V 2210/1429; G01V 1/48; G01V 1/52; G01V 1/3808; G01V 1/40; G01V 11/002; G01V 11/005; G01V 1/16; G01V 1/3852; G01V 1/42; G01V 2210/1423; G01V 11/00; G01V 1/18; G01V 1/184; G01V 1/202; G01V 1/208; G01V 1/226; G01V 1/364; G01V 1/3817; G01V 1/3843; G01V 2001/207; G01V 2210/56; G01V 2210/6163; E21B 17/07; E21B 17/073; E21B 17/18; E21B 3/02; E21B 44/04; E21B 47/00; E21B 47/017; E21B 47/06; E21B 47/07; E21B 47/085; E21B 47/18; E21B 49/081; E21B 49/0875; E21B 47/01; E21B 17/02; E21B 17/026; E21B 19/08; E21B 17/023; E21B 23/00; E21B 23/01; E21B 31/06; E21B 31/107; E21B 31/18; E21B 33/1208; E21B 37/00; E21B 37/08; E21B 41/0092; E21B 41/02; E21B 43/10; E21B 43/26; E21B 47/04;

(Continued)

(56) References Cited

U.S. PATENT DOCUMENTS 2,959,241 A 11/1960 Kokesh
4,775,009 A 10/1988 Wittrisch et al.
(Continued)

FOREIGN PATENT DOCUMENTS

GB 2393749 A 4/2004

*Primary Examiner* — Dionne Pendleton
(74) *Attorney, Agent, or Firm* — Suiter Swantz pc llo

(57) ABSTRACT

A downhole seismic array is disclosed. The array comprises a load-bearing cable for carrying a series of seismic sensor units arranged along its length. Each seismic sensor unit is attached to the load-bearing cable via a vibration-absorbing material and has a magnet to attach the seismic sensor unit to the well casing.

16 Claims, 5 Drawing Sheets

(58) Field of Classification Search
CPC ........ E21B 47/10; E21B 47/103; E21B 49/00;
E21B 49/08; G01B 7/06; G01B 7/00;
Y10S 181/401; Y10S 367/911; Y10S
367/912; B05B 5/081; B05B 5/084; B05B
5/1683; B05C 19/001; B05C 19/002;
G01D 5/35361; G01H 9/004; G01L
1/242; G01L 1/246; G01N 33/24; G01N
33/246; G06F 30/20; H01F 7/04; H04Q
2209/30; H04Q 2209/40; H04Q
2209/886; H04Q 9/00
See application file for complete search history.

(56) References Cited

U.S. PATENT DOCUMENTS

| | | | |
|---|---|---|---|
| 4,953,136 A | 8/1990 | Kamata et al. | |
| 5,259,452 A | 11/1993 | Wittrisch | |
| 5,372,207 A | 12/1994 | Naville et al. | |
| 6,170,601 B1 | 1/2001 | Nakajima et al. | |
| 7,178,627 B2 | 2/2007 | West et al. | |
| 7,567,485 B2 | 7/2009 | Nutt et al. | |
| 7,721,809 B2 | 5/2010 | Minto | |
| 7,933,165 B2 | 4/2011 | Thompson et al. | |
| 8,368,553 B2 | 2/2013 | Zannoni et al. | |
| 8,451,136 B2 | 5/2013 | Jaques et al. | |
| 8,960,313 B2 | 2/2015 | Dyer et al. | |
| 9,217,320 B2 | 12/2015 | Odashima et al. | |
| 2004/0223410 A1* | 11/2004 | West | G01V 1/40 367/25 |
| 2006/0115335 A1* | 6/2006 | Allen | E21B 47/01 405/274 |
| 2007/0215345 A1 | 9/2007 | Lafferty et al. | |
| 2008/0236842 A1* | 10/2008 | Bhavsar | E21B 41/02 166/381 |
| 2011/0083845 A1* | 4/2011 | McLaughlin | E21B 47/01 166/254.2 |
| 2011/0222368 A1 | 9/2011 | Fussell | |
| 2012/0055669 A1* | 3/2012 | Levin | E21B 33/1208 166/250.17 |
| 2013/0058192 A1* | 3/2013 | Gateman | G01V 1/3843 367/20 |
| 2013/0153243 A1 | 6/2013 | King | |
| 2013/0186645 A1 | 7/2013 | Hall | |
| 2016/0033665 A1 | 2/2016 | Ikegami et al. | |
| 2016/0230535 A1 | 8/2016 | Sobolewski et al. | |
| 2017/0154714 A1 | 6/2017 | Katayama et al. | |
| 2017/0199294 A1 | 7/2017 | Xia et al. | |
| 2018/0087956 A1 | 3/2018 | Jung et al. | |
| 2018/0113228 A1* | 4/2018 | Drange | G01V 1/3808 |
| 2018/0136348 A1* | 5/2018 | Guizelin | G01V 1/201 |
| 2020/0116009 A1* | 4/2020 | Marcuccio | E21B 49/081 |

\* cited by examiner

BOREHOLE SEISMIC SENSOR ARRAY AND ASSOCIATED METHODS

CROSS-REFERENCE TO RELATED APPLICATIONS

The present application claims the benefit under 35 U.S.C. § 119(e) of U.S. Provisional Application Ser. No. 62/726,819, filed Sep. 4, 2018, and titled "Borehole Seismic Sensor Array and Associated Methods," which is incorporated herein by reference in its entirety.

FIELD OF THE INVENTION

The invention relates to seismic sensor arrays, and in particular to those used downhole within a well casing.

BACKGROUND

Existing three component downhole seismic equipment is limited in the number of levels that can be recorded. This equipment is also expensive and may not provide sufficiently good quality data.

With existing equipment, when planning a Vertical Seismic Profile (VSP) project, industry is faced with the choice of having large distances between the receivers which will allow a larger portion of the well to be covered but reduces the resolution; or having the receivers close together to acquire higher resolution data, but then only a portion of the well can be covered. In both cases there is usually the option to move the array one or more times and re-acquire the VSP survey, but this can be time consuming, expensive and may not improve the quality of the processed data as much as might be expected.

US 2004/223410 discloses methods and apparatus for detecting seismic waves propagating through a subterranean formation surrounding a borehole. In a first embodiment, a sensor module uses the rotation of bogey wheels to extend and retract a sensor package for selective contact and magnetic coupling to casing lining the borehole. In a second embodiment, a sensor module is magnetically coupled to the casing wall during its travel and dragged therealong while maintaining contact therewith. In a third embodiment, a sensor module is interfaced with the borehole environment to detect seismic waves using coupling through liquid in the borehole. Two or more of the above embodiments may be combined within a single sensor array to provide a resulting seismic survey combining the optimum of the outputs of each embodiment into a single data set.

US 2011/0222368 discloses a seismic tool system includes a cable adapted to be deployed within a borehole; and one or more seismic tools suspendable from the cable in the borehole. At least one of the seismic tools includes at least one seismic sensor enclosed within a housing; one or more rollers attached to the housing and adapted to engage the borehole; and a bow spring attached to the housing and including one or more rollers adapted to engage the borehole. The one or more of the rollers are in acoustic communication with the seismic sensor.

SUMMARY

In accordance with the invention, there is provided a downhole seismic array comprising:
a load-bearing cable;
a series of seismic sensor units arranged along a length of the load-bearing cable, wherein each seismic sensor unit is attached to the load-bearing cable via a vibration-absorbing material and has a magnet to attach the seismic sensor unit to the casing of a cased well.

The well casing may comprise a magnetic material such as steel and/or iron.

The seismic sensor unit may comprise a low-friction transport mechanism configured to allow the seismic sensor unit to move along the well while remaining magnetically attached to the well casing.

The low-friction transport mechanism may comprise one or more wheels configured to space the magnet apart from the well casing.

The low-friction transport mechanism may comprise one or more low-friction layers configured to space the magnet apart from the casing.

The low-friction layer could be in the shape of a strip, rod, bar or wire; or a shaped piece of low-friction material with a triangular or hemispherical cross-section.

The seismic sensor unit may comprise a low-friction transport mechanism comprising a low-friction layer configured to lie between the magnet and the casing when the seismic sensor unit is attached to the casing.

The magnet may be a neodymium magnet or a high temperature samarium cobalt magnet or an Alnico magnet. Alnico alloys have some of the highest Curie temperatures of any magnetic material, around 800° C., although the maximal working temperature may be limited to around 500° C.

The seismic sensor unit may comprise a low-friction layer releasably attached to the sensor unit. The low-friction layer may be configured to lie between the magnet and the well casing.

The coupling force may be changed depending on the borehole wall (or well casing) configuration. For example, a thicker layer of steel may generate a stronger coupling force for the same magnet than a thinner layer of steel. This could be counteracted by refitting the low-friction layer with a thicker lower-friction layer to increase the spacing between the magnet and the borehole wall. Likewise, if the well casing is coated in a non-magnetic material (e.g. corrosion or dirt), the coefficient of friction may be increased and the magnetic coupling decreased. The low-friction layer could be replaced to counteract these variations.

The seismic sensor unit may comprise a low-friction layer having a static coefficient of friction of less than 0.2 (e.g. on a steel borehole). Static coefficients of friction may be higher than the dynamic or kinetic coefficients of friction. This means that once the array is moving, the friction force may be less than when the array is statically in position.

The seismic sensor unit may comprise a low-friction layer of Ultra High Molecular Weight Polyethylene, for example, as either virgin or a high performance UHMW blend, or chrome, or nickel.

The friction between the seismic sensor units and the borehole/well casing may be configured to be commensurate with the weight of the array. Commensurate may be considered to be within 80% (or within 90%). The weight of the array may be greater than the friction between the seismic sensor units and the borehole (so that the array can be slid into position).

The friction between the seismic sensor units and the borehole/well casing may be configured to be commensurate with the weight of the array between the seismic sensor unit and the seismic sensor unit directly above.

The vibration-absorbing material may comprise foam. The foam may be a solid foam. The foam may be a closed-cell foam. A closed cell foam may work well in a well that is not water/fluid filled, but may be compressed by the hydrostatic pressure in a wet well. The vibration-absorbing material may be solid (not foam). The vibration-absorbing material may comprise one or more of: open cell foam; sponge like material; polyurethane and rubber.

The vibration absorbing material may be taped onto a swaged sleeve (e.g. and 2 or more inches of cable either side of the sleeve). The vibration absorbing material may be a part of a removable wrap (like a pliable jacket) that can be reversibly attached (and removed) to the load-bearing cable (e.g. a stop on the load-bearing cable).

One or more of the seismic sensor units may be attached to the load-bearing cable via a swaged sleeve surrounded by the vibration-absorbing material. A swaged sleeve on a wire rope can have an efficiency rating of 98% based on the catalog strength of wire rope (Crosby™ S-409 Cold tuff) so it can withstand very high forces before it slips.

The array may comprise a separate data cable. The data cable may allow data to be transmitted from each sensor to a remote computer.

The load-bearing cable may comprise a data cable. The data cable may comprise a fibre-optic cable. The data cable may comprise an electrical cable.

The load-bearing cable may comprise multiple lines with opposite lays. This may help prevent the array twisting within the borehole because any torsion in one line due to the lay may be at least partially cancelled out by torsion in an opposite direction in another line.

The cable may be a wireline cable. The cable may be a 0.322-inch wireline cable (or between ¼ inch and ¾ inch). The cable may have a breaking strength of at least 8,000 lbs (e.g. 12,000 lbs). The cable may have a breaking strength of less than 20,000 lbs. The cable may have a working load limit of at least 4,000 lbs (e.g. 6,200 lbs). The cable may have a working load limit of less than 10,000 lbs.

The load-bearing cable may comprise one or more of: wire rope, natural rope and synthetic rope.

Each sensor unit may comprise a fibre-optic 3C sensor.

Each sensor unit may comprise a partially-open channel with an elongate curved opening to allow the load-bearing cable to be inserted into, and removed from, the partially-open channel in a bent configuration, such that when the load-bearing cable is straightened within the partially-open channel, the load-bearing cable is securely attached to the sensor unit. The lifting unit for connecting to the top of the array for deploying (inserting and retracting) the array may also comprise a partially-open channel with an elongate curved opening to allow the load-bearing cable to be inserted into, and removed from, the partially-open channel in a bent configuration.

The load-bearing cable may comprise a series of multiple stops, each stop being configured to allow a sensor unit to be attached to the load-bearing cable at a particular position along the load-bearing cable.

The load-bearing cable may comprise a series of multiple stops, each stop being surrounded by a layer of vibration-absorbing material.

According to a further aspect of the present disclosure, there is provided a downhole seismic array comprising:
a load-bearing cable;
a series of seismic sensor units arranged along a length of the load-bearing cable, wherein each seismic sensor unit has a magnet with a separate low-friction layer to attach the seismic sensor unit to the well casing.

According to a further aspect of the present disclosure, there is provided a seismic array comprising:
a load-bearing cable;
a series of seismic sensor units arranged along a length of the load-bearing cable, wherein each seismic sensor unit is attached to the load-bearing cable via a vibration-absorbing material.

According to a further aspect of the present disclosure, there is provided a seismic array comprising:
a load-bearing cable having multiple stops arranged along a length of the load-bearing cable;
a series of seismic sensor units, each seismic sensor unit being releasably connected to a respective stop of the load-bearing cable via a vibration-absorbing material.

It will be appreciated that embodiments without magnets could be used in non-magnetic boreholes (e.g. where there is not steel or iron well casing) or on the surface or at the ocean bottom.

Each seismic sensor unit may be configured to attach to the wall using one or more of: a wheel, an extendable engagement arm and a magnet.

The cable may comprise one or more stops, each stop being a fixed attachment point (e.g. a swaged sleeve on a wireline cable/wire rope, or a molded or epoxied sleeve on a cable, a knot on a rope) on a load bearing cable (where the load bearing cable could also be the data cable). Each stop may be configured to attach a sensor that is not rigidly attached (i.e. it is free-floating, but still able to stay attached to the cable even when subjected to high forces) with a layer of vibration-absorbing material (e.g. closed cell foam, open cell foam, etc.). The layer of vibration-absorbing materials may allow a high degree of decoupling of the sensor from the load bearing cable. The sensor may be free-floating in that there is a degree of play or backlash between the stop and the attached sensor. Backlash, sometimes called lash or play, is a clearance or lost motion in a mechanism caused by gaps between the parts. There may be axial play (e.g. aligned with the longitudinal axis of the load-bearing cable) and/or transverse play (e.g. movement transverse to the longitudinal axis of the load-bearing cable).

The sensor unit may be of rigid construction with no moving parts.

The sensor unit may be formed of one or more components which have a fixed spatial relationship. For example, the sensor unit may comprise wheels attached to the body of the sensor unit. The wheel may rotate with respect to the sensor unit body but may be configured not to move (translationally) with respect to the sensor unit body.

The sensor unit and/or array may be configured not to span the width of the bore. That is, the sensor unit and/or array may be configured to move down one side of the well casing. The sensor unit and/or array may be configured to remain attached to the wall of the well casing using an attractive force (e.g. a magnet).

A hodogram may be represented as a crossplot of two components of particle motion over a time window. Hodograms are generally used in borehole seismology to determine arrival directions of waves and to detect shear-wave splitting. Data recorded along two geophone axes are displayed as a function of time.

The lay of a rope is a description of the way wires and strands are placed during construction. Right lay and left lay refer to the direction of strands.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 1b is a cross-sectional side view of one of the sensor units of FIG. 1a.

DETAILED DESCRIPTION

Introduction

Figure 1A:
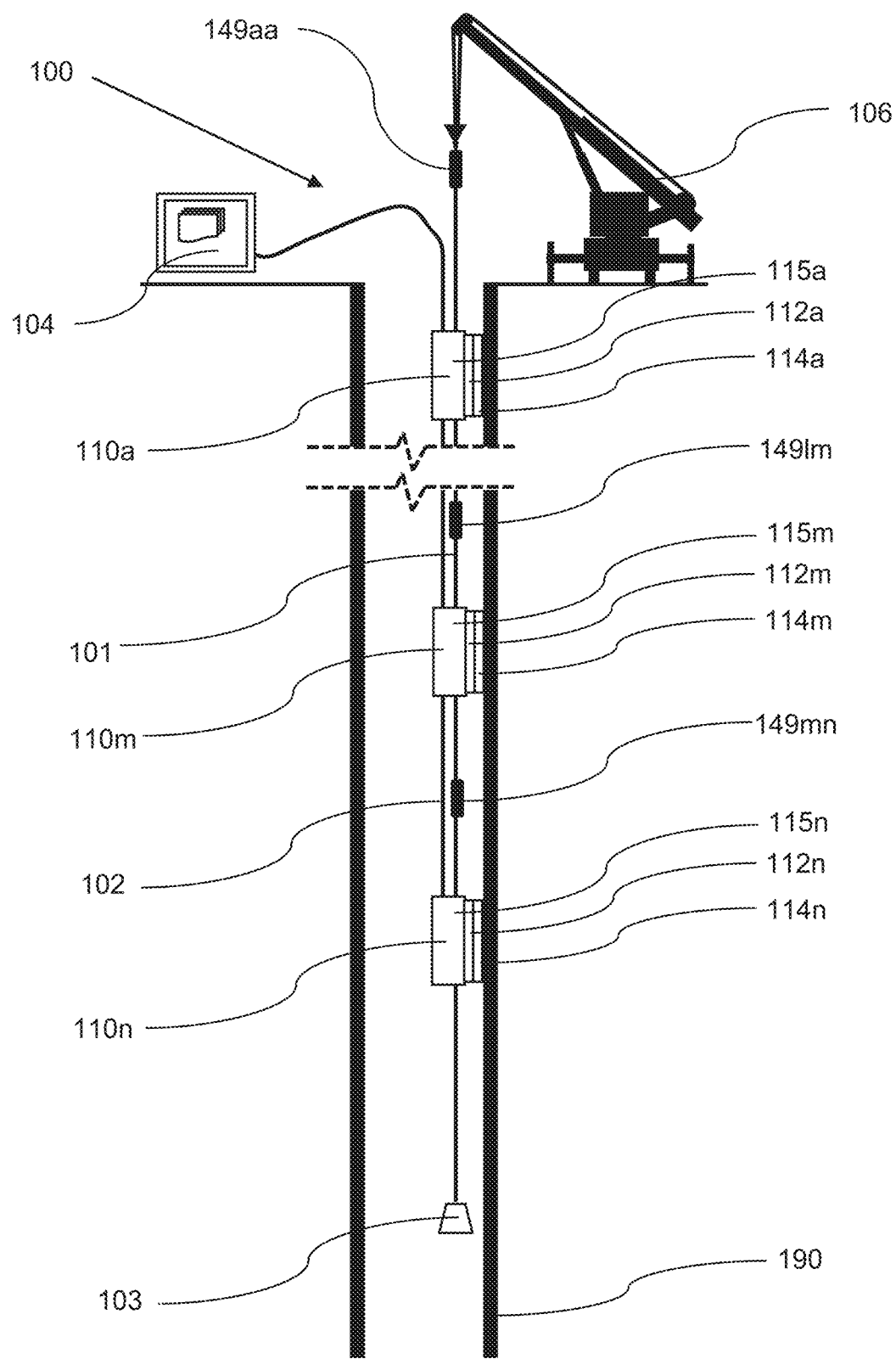
FIG. 1a is a cross-sectional side view of an embodiment of a downhole borehole seismic array in position within a borehole.

Most existing downhole seismic equipment uses an active coupling method where the receivers are lowered into position and then a clamping arm (hydraulic or electro-mechanical) is activated to push against one side of the casing causing the receiver to be pushed against the other side. Active couplings methods add weight to the sensor and add a significant cost. The method might work adequately with a limited number of sensors, but the weight and the cost both can become prohibitive when applied to a larger number of sensors (e.g. many hundreds). Putting a large number of sensors in the well is a significant financial risk, as downhole incidents may reduce the likelihood of the complete recovery of the downhole asset.

Many of the existing downhole tools (or arrays) can also suffer from degradation in the data quality. The size and weight of the individual levels can cause some mechanical resonance that interferes with the seismic frequencies. In addition, some of the coupling methods used (e.g. using a mechanical clamping arm) do not have the same sensor response in the crossline direction (perpendicular to the clamping arm) as they do in the inline direction. This can be detected when looking at the hodogram analysis of the horizontal component first breaks, which show an ellipse instead of the theoretical straight line.

Other systems do not use mechanical arms, but the sensors become rigidly attached of the cable which is under high tension. This means that the signal (motion or vibration) that is detected at one sensor can be transmitted by the cable, affecting other sensors. This transmitted signal is unwanted noise because the motion or vibration detected is from the cable and not the movement of the borehole. Also, if any sensor shifts by even a microscopic amount, it causes a "ping" that radiates out from that sensor, affecting many other sensors above and below the source of that noise.

In addition, by supporting the full weight of the array on a cable, the sensor units at the top may be connected to a cable under greater tension than those at the bottom (because the cable at the top is supporting the weight of the entire array, whereas the cable at the bottom is supporting only the weight of the array below it). Therefore, each sensor unit may provide a different response to the same seismic waves because motion of the sensor unit is restricted in a different way depending on the cable tension.

Another issue that may affect the data quality in the data processing stage is that there can be a discrepancy on the actual depth of the downhole sensors. This is due to friction in the well that can cause the actual stretch of the wireline cable supporting the downhole array to be different to the predicted amount of stretch.

The inventors have therefore identified a need for a low-cost borehole seismic array that provides a large number of levels and high-quality data. In particular, the present arrangement may help facilitate covering the whole well with closely spaced 3-component sensors so that there is reduced (or no) spatial aliasing of the data.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

First Embodiment

Figure 1B:
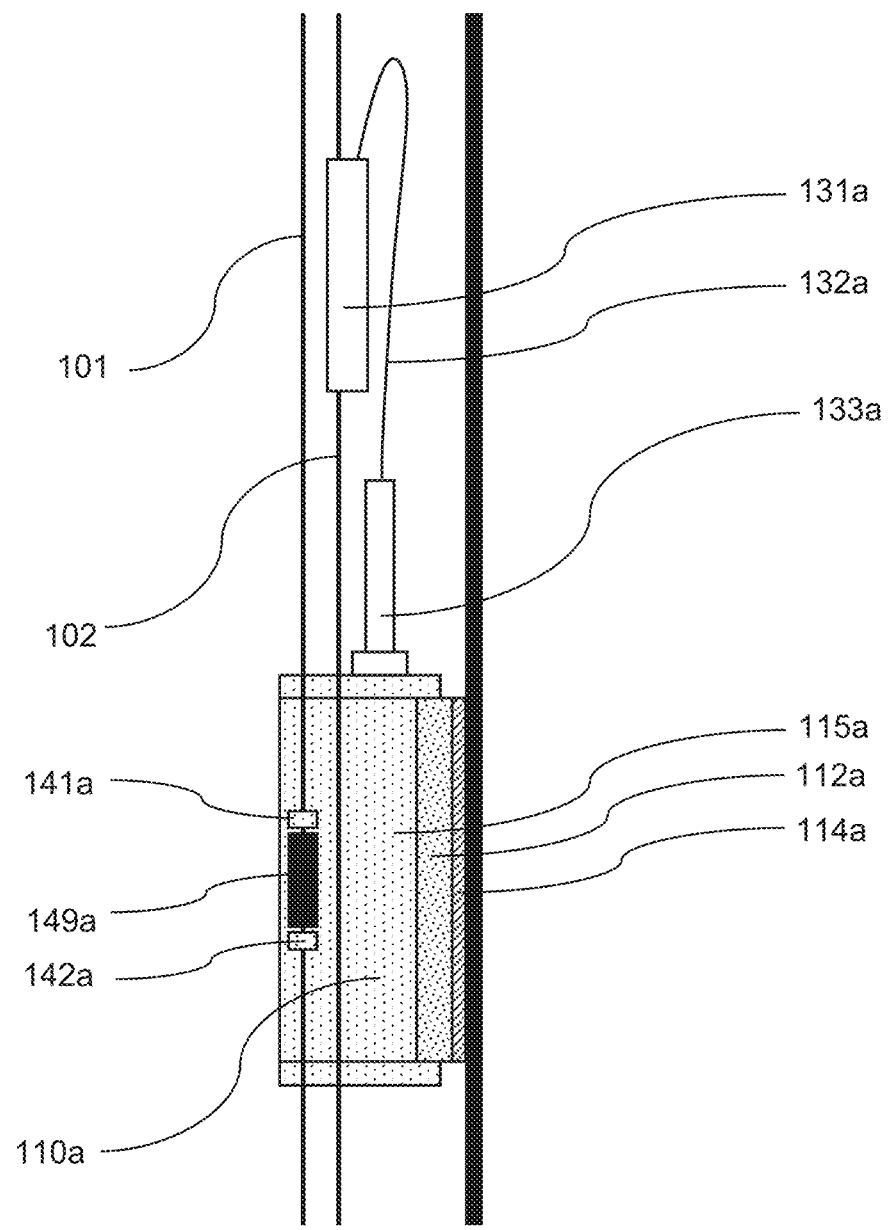
Figure 1C:
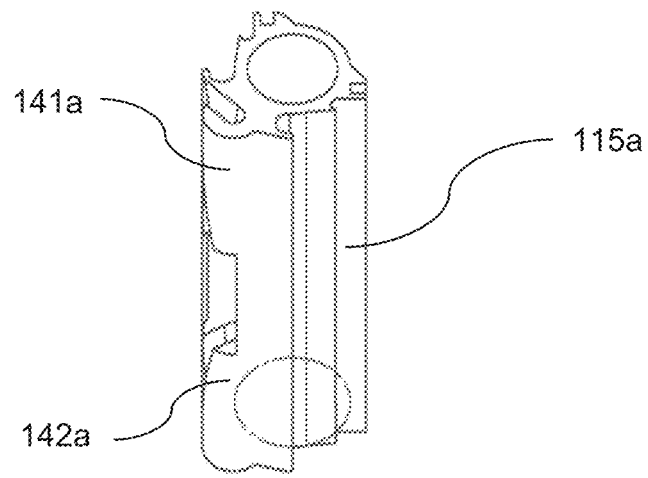
FIG. 1c is a perspective view of the sensor unit body of FIG. 1b.
Figure 1D:
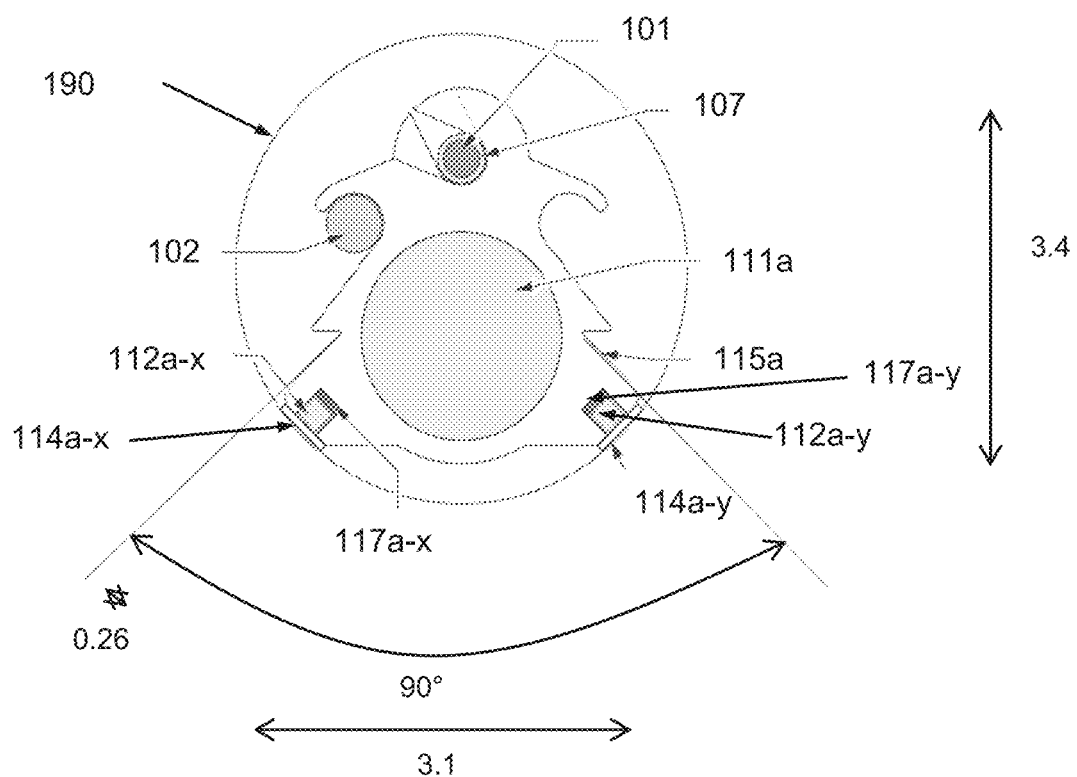
FIG. 1d is a transverse cross-section of the sensor unit of FIG. 1b.
Figure 1E:
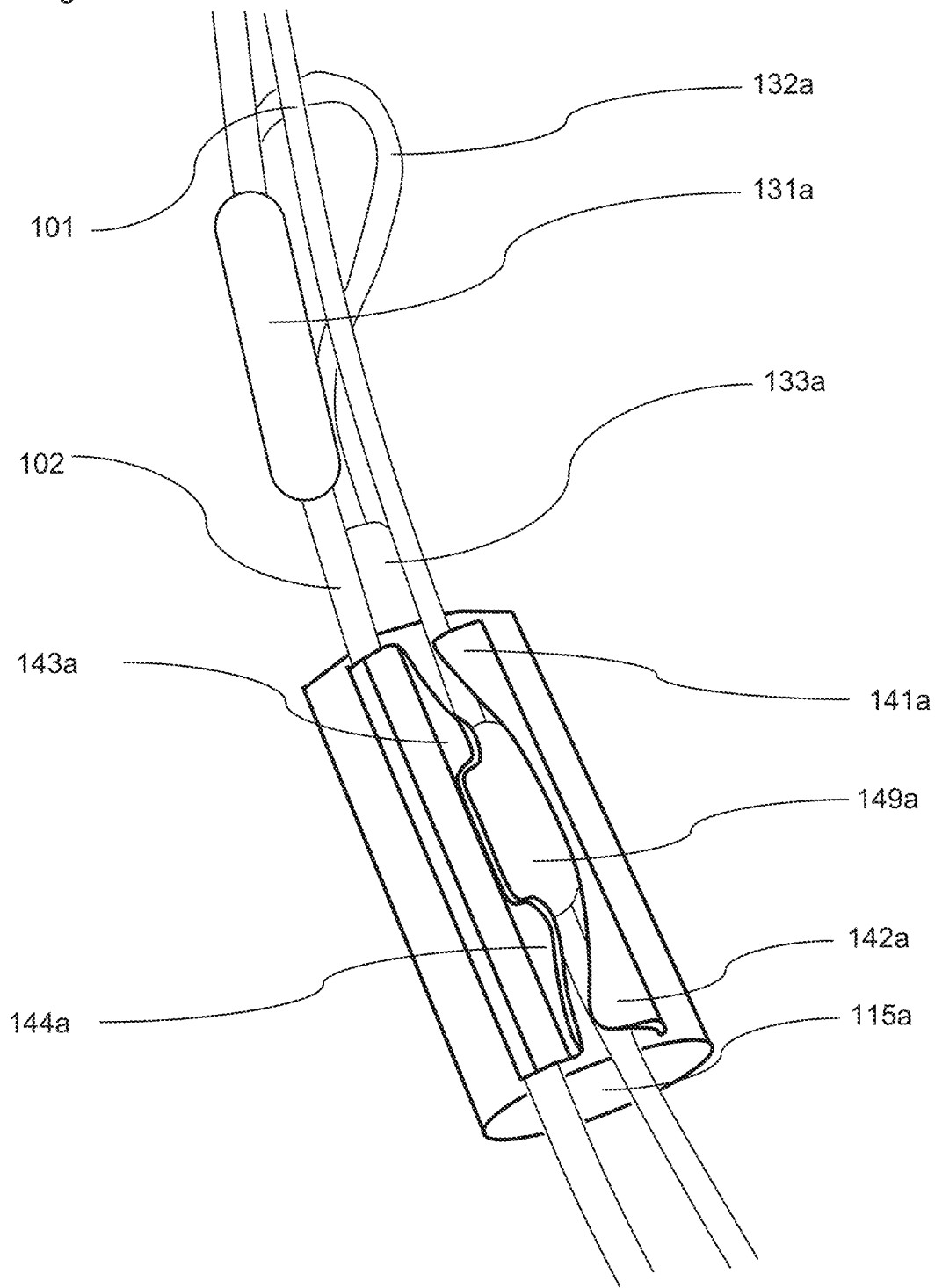
FIG. 1e is a perspective view of the sensor unit of FIG. 1b attached to the load-bearing and data cables.

FIGS. 1a-e show various aspects of a downhole seismic array 100. In particular, FIG. 1a shows the array when it is in position within the well casing and each sensor unit is attached to the borehole wall (or well casing). FIG. 1b is a close-up of one sensor unit within the array. FIG. 1c shows the sensor unit body and FIG. 1d is a cross-section of the sensor unit showing how the cables and magnets are positioned with respect to the sensor unit body (example dimensions are given in inches). FIG. 1e is a perspective view of one sensor unit attached to the load-bearing and data cables.

As shown in FIG. 1a, the downhole seismic array 100 comprises:

a load-bearing cable 101;

a series of seismic sensor units 110a-n arranged along a length of the load-bearing cable 101, wherein each seismic sensor unit is attached to the load-bearing cable via a vibration absorbing material 107 and has a magnet 112a-m to attach the seismic sensor unit to the well casing.

The vibration-absorbing material is, in this case, part of the load-bearing cable. The load-bearing cable 101 comprises stops fitted to a cable running the length of the array onto which the sensor units are attached (e.g. by clips). Using an unbroken cable make the array stronger and reduce the need for the sensor units themselves to carry any load. The stops, in this case, are configured to interact with the sensor unit body to restrict motion of the sensor unit along the load-bearing cable. The stops may allow a sensor unit to be replaced at a reproducible position. Each stop, in this case, comprises a swaged sleeve attached to the cable. The swaged sleeve is a steel Crosby S-409 swaged stop sleeve for 5/16-inch wire rope. The stops in this case are covered by vibration-absorbing material. The sensor unit may be releasably attached to the load-bearing cable.

The stops, as in this case, may have a secondary purpose of facilitating lifting the array. That is, the same swaged sleeves to which the sensors attach can be used for lifting purposes. For example, in certain embodiments there are sleeves every 1 m along the cables with the sensors positioned every 2 m along the cable (every other stop—though the cables can be doubled up and interleaved so that there is a sensor every 1 m).

In this case, the array is configured to be passively coupled to the well casing. That is, the attachment mechanism (e.g. the magnetic attachment mechanism) is configured to be permanently activated rather than having to be turned on and off.

As shown in FIG. 1a, the array has been lowered into position by attaching each magnet to the side of the well borehole. As the load-bearing cable is lowered and lifted by the deployment mechanism 106 the magnets 102a-n slide along the inside of the well casing 190.

In this case, the sensor units are spaced apart by around 2 metres. Other embodiments may have different spacings (e.g. between 0.5 and 10 metres). In this case, one section of the array comprises 24 sensor units (over a 48-metre cable). Other arrays may have between 10 and 300 sensor units in a section (e.g. between 40 and 100).

Some sensor unit housings may house a sensor and a D-unit (or a DD-unit). In their normal use on the surface, three VectorSeis sensors would connect to a "D-unit"—the electronics that handles the data transmission to the Recorder on the surface. In some embodiments, the electronics from two D-units are housed in a cylindrical housing that is more suited for downhole use (thereby forming a DD-unit). With this configuration, 6 sensors will send their data to one "DD-unit" before being transmitted to the surface. A 48 m cable would have 24 sensors and 4 DD-units along it. The D- and DD-units may be used with VectorSeis MEMS sensors. Putting multiple units into one housing may help reduces the cost by reducing the number of waterproof connectors required.

This embodiment uses passive coupling (in the form of a magnet) to connect the seismic sensor units 101a-n to the well casing 190. The casing wall 190 is typically made of a magnetic material such as iron or steel. Using passive coupling, which does not require activation, reduces the number of moving parts which can help prevent malfunctions after the array has been inserted into the well casing 190. It may also help reduce the weight of the array which in turn reduces the tension on the cable. This helps reduce the likelihood of vibrations and other movements in part of the array being transmitted to other sensor units. Passive coupling may also keep the cost down.

Each sensor unit 110a-n comprises a seismic sensor 111a (see FIG. 1d). In this case, the sensors are relatively small and light-weight, around 1.3 kg (e.g. between 1-3 kg) and 18 cm long (e.g. between 10-30 cm). The lighter the sensor, the less force is required to couple it to the well and the lower the tension required on the cable. The sensors in this case are VectorSeis® (INOVA Geophysical) MEMS accelerometers which are usually used for surface seismic projects.

As shown in FIG. 1d, the sensor unit body 115a are built in an approximate triangular shape such that two edges of the sensor are in contact with the casing. That is, the magnets 112a-x, 112a-y which connect the sensor unit to the well casing are positioned about 90° apart with respect to the MEMS sensor. This allows the sensor unit to capture the full wavefield with a high degree of vector fidelity. This sensor is optimised for a 4-inch inner diameter (ID) casing.

For certain sizes of well casing, the two sides of the sensors will couple orthogonally to the casing. This allows a very clean signal to be recorded on all three components. The benefit of this can be seen when carrying out hodogram analysis as the resulting hodogram is less affected by coupling of vibrations between the various axes.

It will be appreciated that, having sensors all the way to the surface reduces depth uncertainty, particularly as there is not much stretch in the load-bearing cable. Another benefit of having sensors all the way to the surface is that all the data transmission distances are short, so high data rates can be maintained allowing real time collection of the seismic data.

In this case, each seismic sensor unit comprises a low-friction layer 114a-n configured to lie between the magnet 112a-n and the well casing 190 when the seismic sensor unit 110a-n is attached to the well casing.

In this case, the coupling method uses permanent magnets 112a-n separated from the steel casing by a replaceable "wear strip", which is a layer 114a-n of low-friction material. If needed, the thickness and type of the material can be changed to modify the coupling force and change the coefficient of friction. The strength and the number of magnets can also be modified to change the coupling force. As shown in FIG. 1d, the magnets 112a-x, 112a-y are attached to the sensor unit body by a magnet attachment strip 117a-x, 117a-y. Each magnet is attached to the well casing using a low-friction layer of material 114a-x, 114a-y.

These variables (magnetic strength, coefficient of friction, weight) are balanced so that in a typical well, the weight of the array is approximately equal to, or slightly more than, the friction. Adding some extra weight to the bottom end of the array allows the array to be deployed. When the weights reach the bottom of the well, the array comes to a stop and there is very little tension left in the load-bearing cable. This means that the load-bearing cable is not under significant tension and it is subject to only a small amount of stretch.

In another embodiment, the weight 103 at the bottom end may be releasable. For example, the weight may comprise an openable vessel filled with liquid (e.g. water). When the array is in place, the liquid may be released in response to a control signal from surface to remove tension on the cable.

In this case, the low-friction layer 114a-n is releasably attached to the sensor unit 110a-n. This allows the low-friction layer 114a-n to be replaced in response to damage or excessive wear. It may also allow the low-friction layer 114a-n to be replaced with another low-friction layer with different properties. For example, the low-friction layer may be chosen to control the coefficient of friction (different materials and shapes may provide different coefficients of frictions) or control the magnetic strength (a thicker layer may reduce the magnetic strength by increasing the spacing between the magnet and the well casing wall).

In this case, the low-friction layer comprises 0.060 inch thick, ½-inch wide Ultra High Molecular Weight Polyethylene In this case, the friction between a said seismic sensor unit and the well casing is configured to be commensurate with the weight of the array between the seismic sensor unit and the seismic sensor unit directly above. That is, the friction force of each sensor unit may be configured to balance the weight of that unit. This reduces the tension on the cable and may also mean that each sensor unit is in a comparable environment as the tension is more uniform along the length of the cable.

In this case, the sensor unit is attached to the cable 101 via a swaged sleeve 149a surrounded by the vibration-absorbing material 107 (e.g. in a layer). That is, a metal sleeve is swaged on to the load-bearing cable at a position corresponding to the desired position of the sensor unit. This swaged metal sleeve is then covered by a vibration-absorbing material 107.

The vibration-absorbing material 107 comprises closed cell NDAX Neoprene foam. In this case, the swaged sleeve of the load-bearing cable surrounded by the vibration-absorbing material is positioned within clip connectors 141a, 142a, 143a, 143a in the sensor unit body. The clip connectors form a partially open channel with a floor, walls and a partially enclosed roof. The partially enclosed roof has an elongate opening extending the length of the partially open channel, wherein at least a portion of the elongate opening forms an angle with the elongate axis of the channel (e.g. by being bent, curved or lying at an angle to the elongate channel axis). In this way, the clip connectors are configured such that the load-bearing line must be bent to insert or remove the swaged sleeve 149a from the sensor unit body 115a. When the load-bearing cable is under tension and straight (e.g. when lowered into a well), it is securely fastened to the sensor unit body.

To attach a sensor to the load-bearing cable, the cable has to be pulled into an arc, which then allows the cable and the swaged sleeve to be slipped into the cut-out area of the sensor. When the cable is straight, as it is when in a well, the sensor is attached and not able to come off. This is a quick release method of attaching the sensor to the cable. The inventors have found that it allows the sensor to be replaced in as little as 10 seconds (e.g. less than 30 seconds). It may also allow a degree of free movement of the sensor (up to 3 mm) which helps allow the sensor to properly couple to the casing and to decouple from the load-bearing cable.

That is, the sensor unit is decoupled from the steel wireline load-bearing cable so that the sensor has a certain amount of freedom to move even if the cable is under some tension. Similarly, vibrations in the cable are attenuated from being transmitted to the sensor units. In addition, the vibration-absorbing material may help damp any vibrations in the cable by absorbing the energy of the vibration.

As shown in FIG. 1e, the sensor unit is held in place by a swaged sleeve on the load-bearing cable, but there is a layer of vibration-absorbing material between the sensor and the cable so that there is no metal-to-metal contact between the load-bearing cable and the sensor. This method of acoustic decoupling means that the seismic signal detected at one sensor is heavily attenuated before reaching the load-bearing cable and any noise that is travelling along the cable is heavily attenuated before it can affect the sensors.

The swaged sleeve stops may have a secondary purpose of facilitating lifting the array. In this case, there are stops every 1 m along the cables with the sensors positioned every 2 m along the cable (every other stop—though the cables can be doubled up and interleaved so that there is a sensor every 1 m). For clarity, the stops between the sensor units have two letters (e.g. 149aa, 149lm, 149mn) to distinguish between stops which support sensors (e.g. 149a, 149m, 149m) and to keep the letters associated with each sensor unit consistent. Otherwise, the stops may be considered to be the same. On the surface, one of stops 149aa is inserted into the lifting tool. The deployment mechanism (in this case crane 106) can then lift the array for lowering into or extraction from the borehole. The lifting tool may comprise a channel for receiving the stop and a gripping mechanism for preventing the stop getting out of the channel (e.g. a pin inserted around the cable which forms a hole smaller than the stop).

In this case, the array comprises a separate data cable 102 which allows data to be transmitted from each sensor to a computer 104 at the surface for processing. The data cable 102 may also allow power to be transmitted to the sensors.

In this case, each sensor unit 110a is connected to the common data cable 102 using a plug 133a inserted into the sensor unit 110a, a dedicated sensor unit cable 132a and a connector 131a connecting the sensor unit cable 132a to the common cable 102. By using a cable 132a between the data cable 102 and the sensor unit 110a, rather than for example plugging directly into the data cable, mitigates vibrations being transmitted via the data cable. The plug, connector and cable are configured such that the sensor unit cable 132a is slack when the array is in position.

In other embodiments, the load-bearing cable comprises a data cable.

Extension Arms

Figure 2:
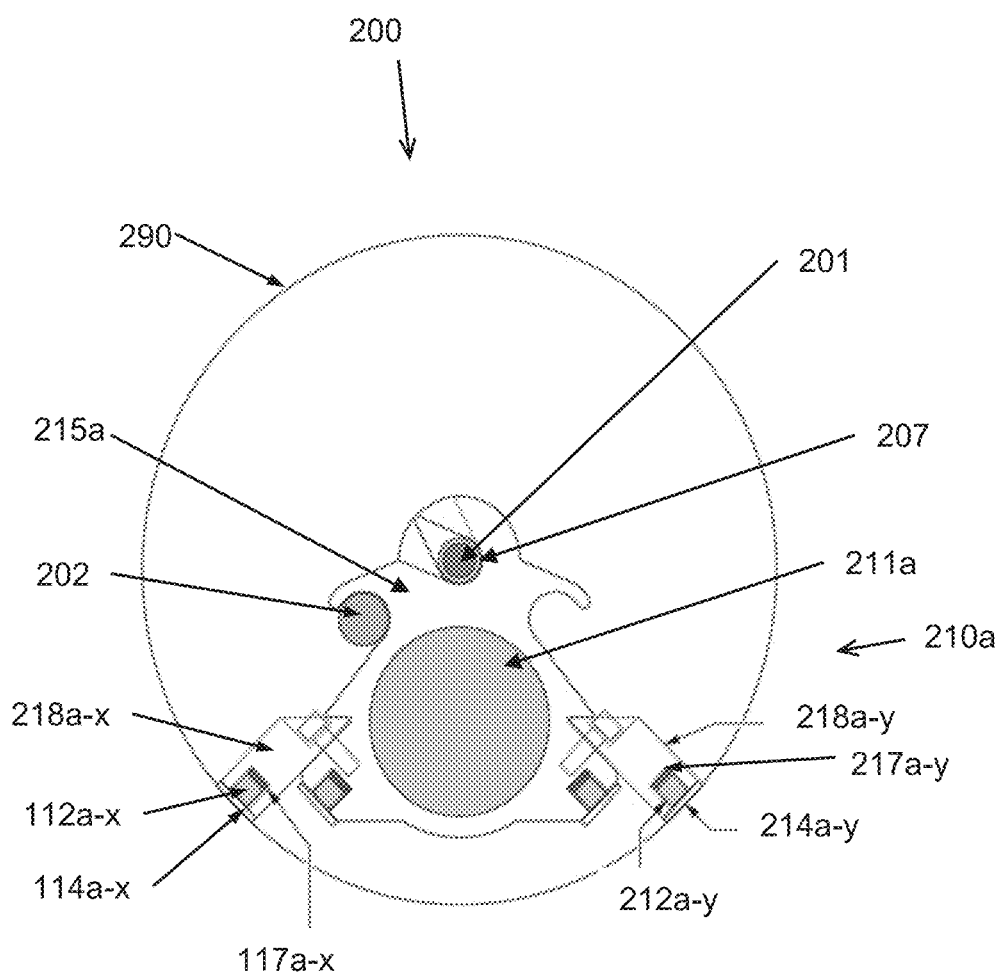
FIG. 2 is a transverse cross-section of an embodiment of a downhole borehole seismic array in position within a borehole.

FIG. 2 is a cross-section of a second embodiment of a downhole seismic array 200 comprising:
 a load-bearing cable 201;
 a series of seismic sensor units 210a arranged along a length of the load-bearing cable 201, wherein each seismic sensor unit is attached to the load-bearing cable via a vibration absorbing material 207 and has a magnet 212a-x, 212a-y to attach the seismic sensor unit to the well casing.

The sensor unit is similar to that described in relation to the embodiment of FIG. 1a. A seismic sensor 211a is housed within the body of the seismic sensor unit 215a. In this case, a separate data cable 202 is used to transmit data from the sensor units to the surface.

In this case, the well casing of the well bore 290 is larger than that of FIG. 1a. This means that the same configuration of magnets as shown in FIG. 1d may not couple as well to the larger diameter. In this case, the sensor unit comprises releasably connected extension arms 218a-x, 218a-y. They connect to the side of the sensor unit and position the magnets 212a-x, 212a-y such that they align with the radii of a larger diameter circle. That is, they are moved apart from each other and from the sensor unit body.

As before, in this case, the magnets are attached to the extension arms by magnet attachment strips 217a-x, 217a-y. Each magnet is attached to the well casing using a low-friction layer of material 214a-x, 214a-y.

Other Options

Other embodiments may include:
 Using fibre optic 3-component sensors instead of MEMS accelerometers.
 Using regular omni-directional geophones
 Using high temperature omni-directional geophones
 Either single-component, 3-component or 4-component sensors (3C+a hydrophone)

The existing system has a wireline cable as the load-bearing cable and swaged sleeves as the attachment points for the sensors. The sensors are electrically connected to a second cable which is not under tension. Variations and future improvements may include:
 Different types of load-bearing cable including wire rope, synthetic rope; different types of data cable like fibre optic.
 combined cables where the data cable is also the load-bearing cable and where the strength members might be in the centre or on the outside or a combination of those.
 The attachment point might be a fitting that is swaged in place, or formed by injection molding or from an epoxy In another variant, the load-bearing cable comprises or may consist of two identical wire ropes except that one has a left lay and the other has right lay of the wire strands. The two cables are swaged together at each receiver point as a minimum. The torque that is generated in each of the two cables cancels itself out. The result is a cable that does not try to rotate.

The technology could easily be used as a seismic land streamer and also for use as an OBC (Ocean Bottom Seismic) system.

Although the present invention has been described and illustrated with respect to preferred embodiments and preferred uses thereof, it is not to be so limited since modifications and changes can be made therein which are within the full, intended scope of the invention as understood by those skilled in the art.

What is claimed is:

1. A downhole seismic array comprising:
a load-bearing cable; and
a series of seismic sensor units arranged along a length of the load-bearing cable, each seismic sensor unit comprising a seismic sensor and a corresponding magnet to attach the seismic sensor to a well casing,
wherein each seismic sensor unit is configured such that each seismic sensor is attached to the load-bearing cable via a vibration-absorbing material, and each seismic sensor is attached rigidly to the corresponding magnet, and
wherein each sensor unit comprises a partially-open channel with an elongate curved opening to allow the load-bearing cable to be inserted into, and removed from, the partially-open channel in a bent configuration, such that when the load-bearing cable is straightened within the partially-open channel, the load-bearing cable is securely attached to the sensor unit.

2. The array of claim 1, wherein seismic sensor unit comprises a low-friction transport mechanism configured to allow the seismic sensor unit to move along a borehole while remaining magnetically attached to the well casing.

3. The array of claim 1, wherein seismic sensor unit comprises a low-friction transport mechanism comprising a rigid low-friction layer rigidly connected to the magnet and configured to lie between the magnet and the well casing when the seismic sensor unit is attached to the well casing.

4. The array of claim 1, wherein each seismic sensor unit comprises a low-friction layer releasably attached to the sensor unit.

5. The array of claim 1, wherein each seismic sensor unit comprises a low-friction layer having a coefficient of friction of less than 0.2.

6. The array of claim 1, wherein each seismic sensor unit comprises a low-friction layer comprising one or more of: Ultra High Molecular Weight Polyethylene, chrome and nickel.

7. The array of claim 1, wherein the friction between the seismic sensor units and the well casing is configured to be commensurate with the weight of the array.

8. The array of claim 1, wherein the friction between a said seismic sensor unit and the well casing is configured to be commensurate with the weight of the array between the seismic sensor unit and the seismic sensor unit directly above.

9. The array of claim 1, wherein the vibration-absorbing material comprises foam.

10. The array of claim 1, wherein each seismic sensor unit is attached to the load-bearing cable via a swaged sleeve surrounded by the vibration-absorbing material.

11. The array of claim 1, wherein the load-bearing cable comprises multiple lines with opposite lays.

12. The array of claim 1, wherein the load-bearing cable comprises a data cable.

13. The array of claim 12, wherein the data cable comprises a fibre-optic cable.

14. The array of claim 1, wherein each sensor unit comprises a fibre-optic 3C sensor.

15. The array of claim 1, wherein the load-bearing cable comprises a series of multiple stops, each stop being configured to allow a sensor unit to be attached to the load-bearing cable at a particular position along the load-bearing cable.

16. The array of claim 1, wherein the load-bearing cable comprises a series of multiple stops, each stop being surrounded by a layer of vibration-absorbing material.

* * * * *